United States Patent [19]

Arick et al.

[11] 3,856,221
[45] Dec. 24, 1974

[54] PUSH-PULL STATOR WINDING APPARATUS AND METHOD

[75] Inventors: Robert E. Arick, Fort Wayne, Ind.; Ralph A. Vogel, Three Rivers, Mich.

[73] Assignee: Essex International, Inc., Fort Wayne, Ind.

[22] Filed: Sept. 4, 1973

[21] Appl. No.: 394,323

[52] U.S. Cl. ............................................. 242/1.1 R
[51] Int. Cl. ......................................... H02k 15/085
[58] Field of Search......... 242/1.1 R, 1.1 A; 29/596, 29/205 R, 205 C

[56] References Cited
UNITED STATES PATENTS

| | | | |
|---|---|---|---|
| 2,967,672 | 1/1961 | Zwayer | 242/1.1 R |
| 3,025,008 | 3/1962 | Nill et al. | 242/1.1 R |
| 3,082,966 | 3/1963 | Frederick | 242/1.1 R |
| 3,347,474 | 10/1967 | Frank | 242/1.1 R |

Primary Examiner—Billy S. Taylor

[57] ABSTRACT

Gun-type apparatus for in-slot winding of dynamoelectric machine stator core members having a winding gun actuated to form a coil with sides in two stator slots and with end turns connecting the coil sides wherein the wire from which the coil is formed is pushed at a linear rate faster than the rate of movement of the gun during formation of the end turns thereby initially forming enlarged end turn loops which are thereafter pulled behind previously formed end turns.

24 Claims, 10 Drawing Figures

PUSH-PULL STATOR WINDING APPARATUS AND METHOD

BACKGROUND OF THE INVENTION

1. Decription of the Prior Art

This invention relates generally to gun-type, in-slot stator winding apparatus and methods, and more particularly to such an apparatus and method wherein the wire forming a coil is pulled during dispensing of the wire into the stator slots and is pushed during formation of the end turns.

2. Description of the Prior Art

One common type of apparatus employed for placing dynamo-electric machine field windings in the slots of a stator core member is the so-called in-slot or gun winder. In that type of apparatus, a free end of the wire is secured and a gun is oscillated through the bore of the stator core member thereby withdrawing the wire from a source and placing it directly in the desired slots; a typical gun winder is shown for example in U.S. Pat. No. 3,025,008 assigned to the assignee of the present application.

In the use of such prior gun-type stator winding apparatus, the end turns connecting the coil sides in the slots have tended to pile up and move in a direction toward the bore of the stator core member thus making it difficult to obtain satisfactory slot fill. Further, in the case of longer span coils, such as in two pole, distributed winding motors, the end turns of the longer span wound by conventional gun-type winding apparatus tended to extend across a part of the bore and thus had to be pushed-back or "blocked" following the winding operation.

In order to hold the end turns, as they are wound, away from the bore, various types of shroud devices have been employed, such as those described and illustrated in the aforesaid U.S. Pat. No. 3,025,008 however, it is necessary manually to attach such shrouds to the stator core member prior to winding and to remove them after the winding operation.

Pivoted fingers have been employed for holding the end turns away from the bore during the winding operation, such pivoted fingers being shown for example in U.S. Pat. No. 2,967,672. A clamping mechanism for holding a stator core member during winding and for releasing the stator core member following winding is shown in U.S. Pat. No. 2,904,270 assigned to the assignee of the present application.

United States Patent application Ser. No. 297,654, filed Oct. 16, 1972 by the present applicants and assigned to the assignee of the present application, discloses an apparatus and method for forming and placing a skein of wire on the blades of coil insertion apparatus, such as that shown in U.S. Pat. No. 3,324,536, that apparatus and method forming the skein of wire by pushing the wire into an undulating configuration. In United States Patent application Ser. No. 321,992, filed Feb. 12, 1973 by the present applicants and also assigned to the assignee of the present application, an apparatus and method is disclosed for pushing wire into stator slots.

SUMMARY OF THE INVENTION

It is desirable to provide gun-type, in-slot stator winding apparatus wherein the aforesaid build-up and movement of the end turns toward the bore is avoided without requiring the use of shroud-type devices.

The apparatus of the invention, in its broader aspects, provides gun-type apparatus for in-slot winding of dynamoelectric machine stator core members having a winding gun adapted to form a coil with sides in two stator slots and with end turns connecting the coil sides with means being provided for pushing the wire from which the coil is formed at a linear rate faster than the rate of movement of the gun during the formation of the end turns.

The method of the invention, in its broader aspects, comprises the steps of pulling wire directly into one stator core member slot thereby to form one coil side, pushing the wire to form one end turn, pulling the wire directly into another slot thereby to form the other coil side, pushing with the wire to form the other end turn, and repeating those steps a predetermined number of times until the coil is completed.

It is accordingly a general object of the present invention to provide improved gun-type, in-slot stator winding apparatus.

Another general object of the present invention is to provide an improved method of winding a dynamoelectric machine stator core member.

A further object of the invention is to provide improved gun-type, in-slot stator winding apparatus which does not require the use of shroud devices to hold-back the end turns.

Yet another object of the invention is to provide improved gun-type, in-slot stator winding apparatus in which the end turns are formed by pushing the wire from which the coil is wound.

A still further object of the invention is to provide the improved in-slot method of winding dynamoelectric machine stator core members wherein the end turns of the coils are formed by pushing the wire from which the coils are formed.

The above-mentioned and other features and objects of this invention and the manner of attaining them will be come more apparent and the invention itself will be best understood by reference to the following description of an embodiment of the invention taken in conjunction with the accompanying drawings.

DESCRIPTION OF THE PREFERRED EMBODIMENTS

Referring now to FIGS. 1 through 6 of the drawings, the apparatus of the invention comprises a frame 10 having a top plate 12, bottom plate 14, side walls 16, and plate 18 intermediate top plate 12 and bottom plate 14.

Top plate 12 has central opening 20 formed therein. Nest plate 22 is removably secured to top plate 12 by threaded fasteners 24, partially closes opening 20 in top plate 12, and has central opening 26 formed therein. Nest plate 22 has groove 28 formed in its upper surface communicating with central opening 26 for supporting and locating stator core member 30 to be wound.

In the illustrated embodiment, stator core member 30 is adapted for use in a two-pole series universal motor. Stator core member 30 has top and bottom sides 32, 34 and radially inwardly extending pole pieces 36 having inner ends defining bore 38. Pole pieces 36 respectively define slots 39 therebetween.

Lower roll-out fingers 40 of the type more fully shown and described in the aforesaid U.S. Pat. No. 2,967,672 are pivotally mounted on nest plate 22, there being a pair of roll-out fingers 40 associated with each pole piece 36. Clamping ring 42 of the type more fully illustrated and described in the aforesaid U.S. Pat. No. 2,904,270 is provided which, in its lowered position, engages upper side 32 of stator core member 30. Clamping ring 42 has a central opening 44 formed therein. Upper roll-out fingers 46 also of the type shown in the aforesaid U.S. Pat. No. 2,967,672 are pivotally mounted on clamping ring 42, there being a pair of roll-out fingers 46 associated with each pole piece 36.

Figure 6:
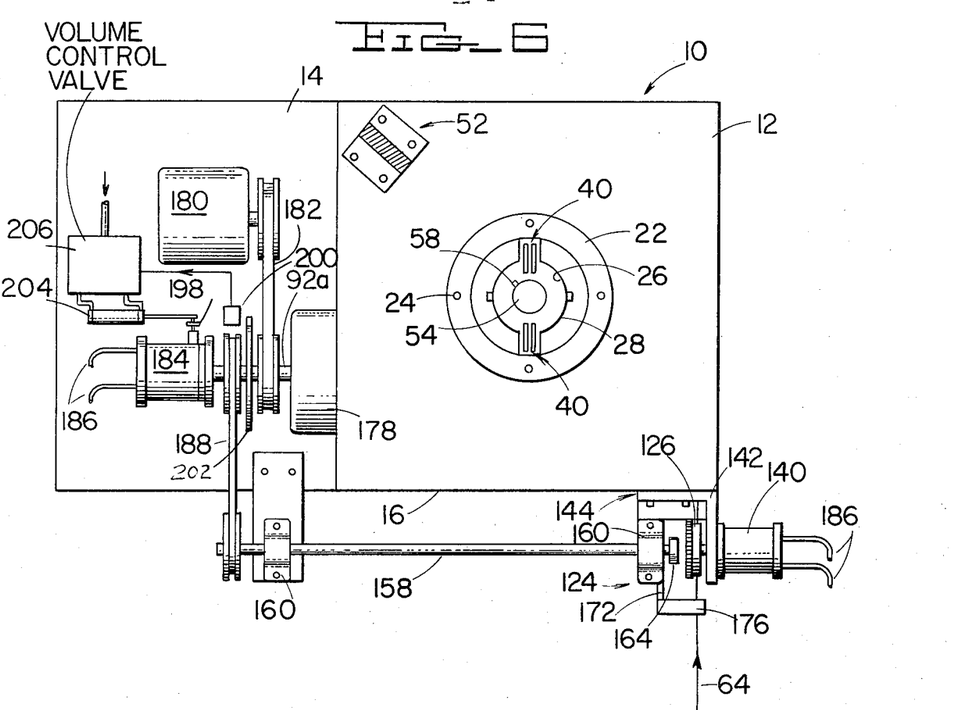
FIG. 6 is a top view of the apparatus of the invention.

Notches 48 are formed in nest plate 22 and receive lifting hook members 50 which form a part of the clamping mechanism more fully described in the aforesaid U.S. Pat. No. 2,904,270, lifting hook members 50 lifting the wound stator member 30 out of nest plate 22 when clamping ring 42 is raised. The clamping mechanism is mounted on top plate 12 of frame 10, as at 52 (FIG. 6).

Figure 1:
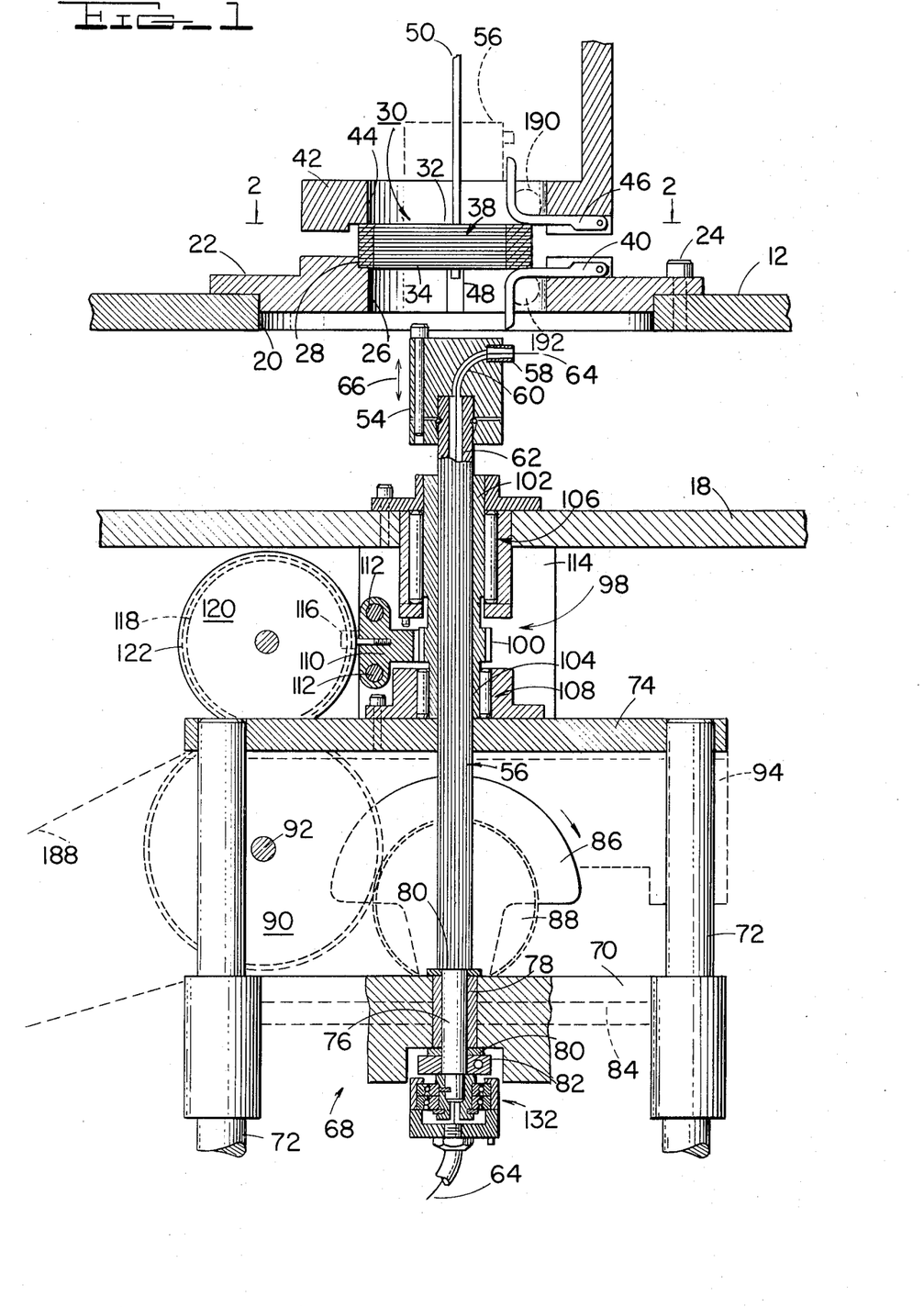
FIG. 1 is a side cross-sectional view showing a part of the apparatus of the invention.

Winding gun 54 is provided mounted on splined shaft 56 and reciprocally moved thereby axially through bore 38 of stator core member 30 from the position shown in solid lines in FIG. 1 spaced from side 34 to the position shown in dashed lines at 56 spaced from side 32. Winding gun 54 has radially-extending wire dispensing needle 58 secured thereto, needle 58 being hollow and communicating with passage 60 in gun 54, which in turn, communicates with passage 62 in splined shaft 56. Wire 64 from which the coils are wound extends through hollow needle 58 and passages 60, 62.

Splined shaft 56 is reciprocated thereby to move gun 54 through bore 38 of stator member 30, as shown by arrows 66, by scotch yoke mechanism 68. Scotch yoke mechanism 68 comprises yoke member 70 slidably mounted on rods 72 extending between bottom plate 14 and connecting member 74. Lower end 76 of splined shaft 56 extends through yoke 70 and is rotatably secured thereto by bushing 78, washers 80, and collar 82.

Yoke 70 has transverse cam slot 84 which receives a roller (not shown) rotatably mounted on crank 86 having gear 88 connected thereto. Crank 86 and gear 88 are rotatably driven by gear 90 on main drive shaft 92. It will now be seen that rotation of main drive shaft 92 will cause yoke 70 to reciprocate on rods 72 between the position shown in solid lines in FIG. 1 and the position shown in dashed lines at 94, thereby reciprocating splined shaft 56 and gun 54 through bore 38 of stator core member 30 as above-described.

Figure 2:
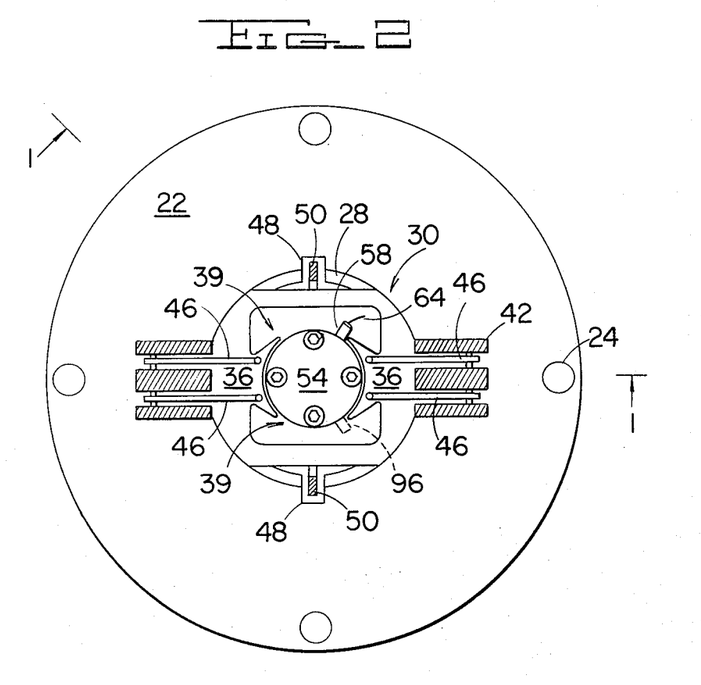
FIG. 2 is a top cross-sectional view taken generally along the line 2—2 of FIG. 1.
Figure 3:
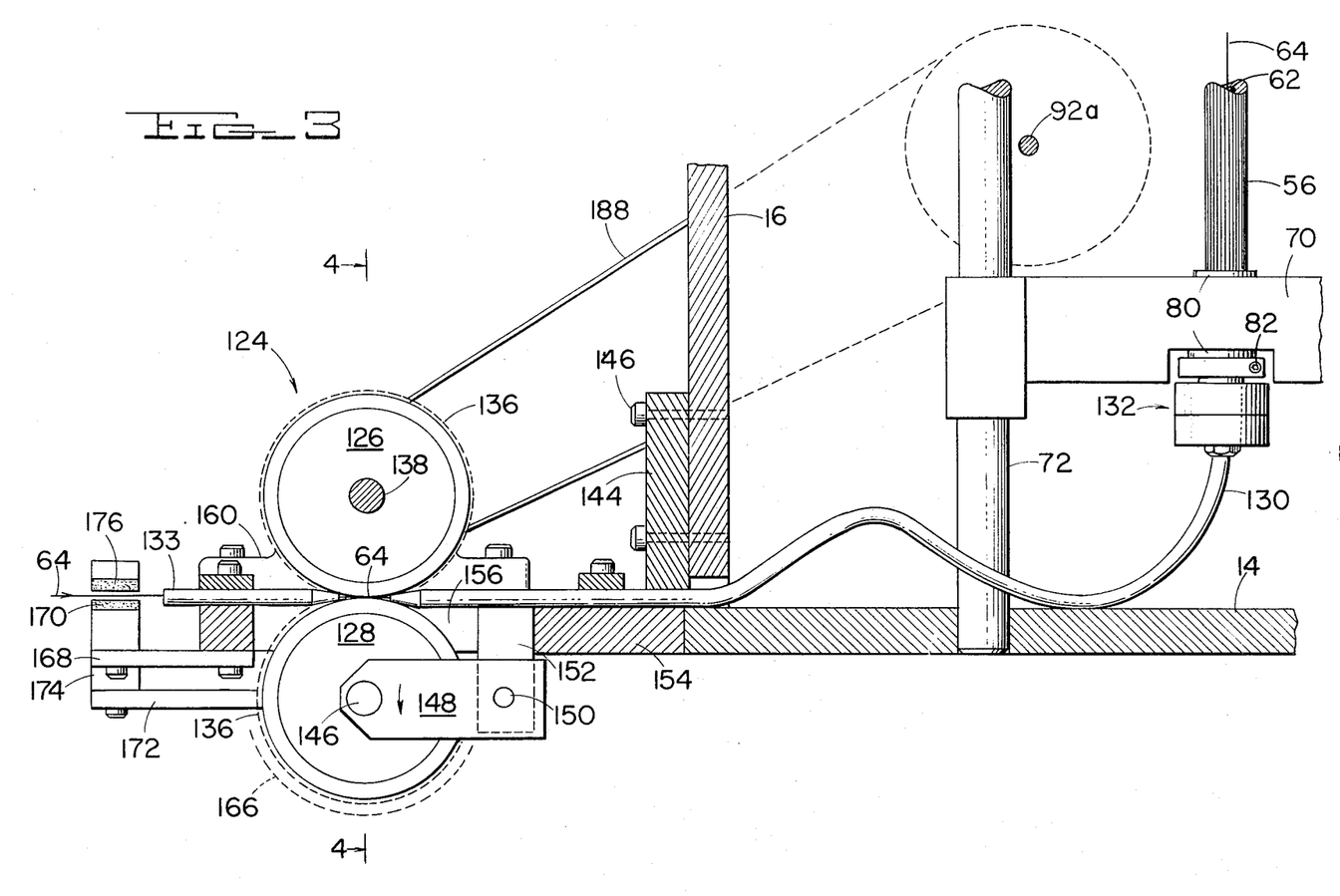
FIG. 3 is a side cross-sectional view showing the remaining part of the apparatus of the invention.
Figure 4:
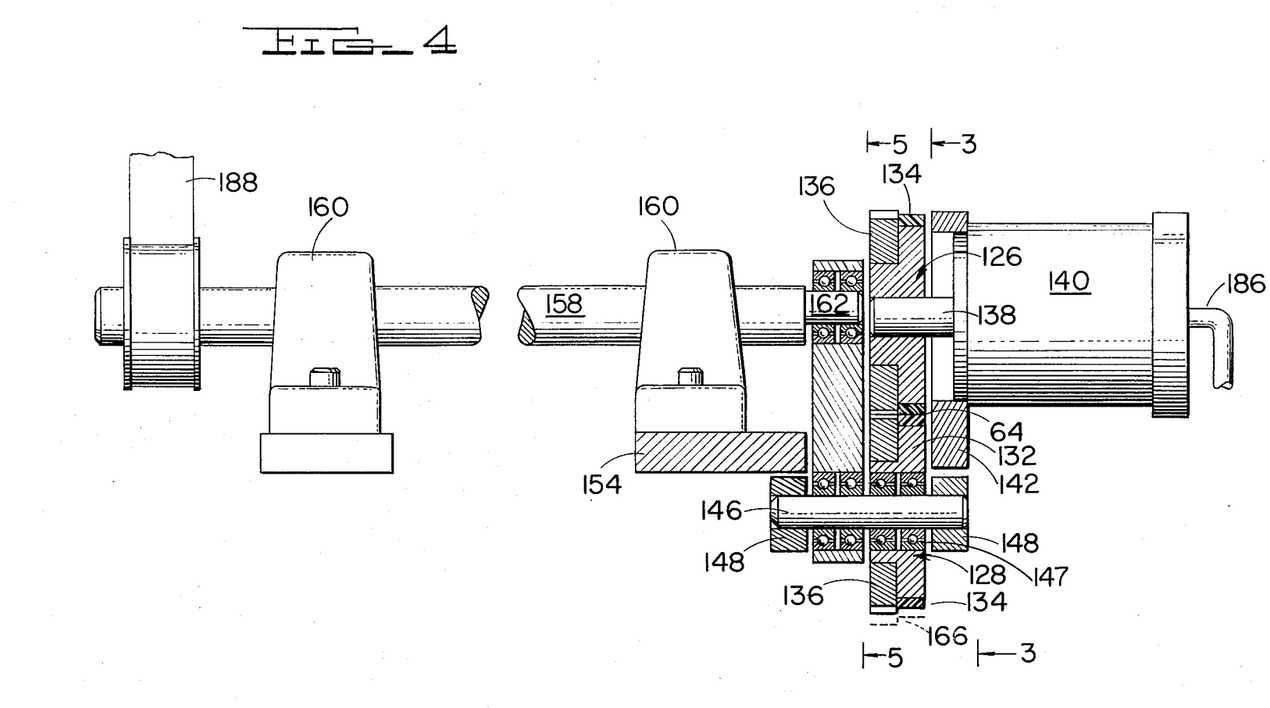
FIG. 4 is an end cross-sectional view taken generally along the line 4—4 of FIG. 3.
Figure 5:
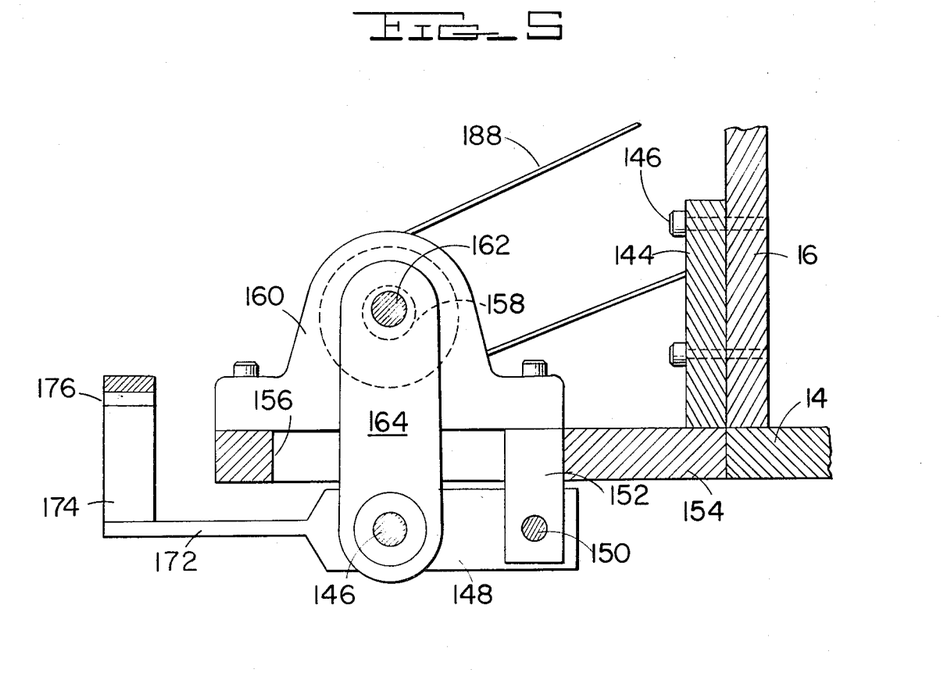
FIG. 5 is a fragmentary cross-sectional view taken generally along the line 5—5 of FIG. 4.

Gun 54 and needle 58 are also rotated in oscillatory fashion from the position shown in solid lines in FIG. 2 to the position shown in dashed lines at 96 by splined pinion and barrel cam assembly 98. Pinion 100 has upper and lower hub portions 102, 104 which, along with pinion 100 are internally splined slideably to receive splined shaft 56. Upper hub portion 102 of splined pinion 100 is rotatably supported by bearing assembly 106 mounted on plate 18, bearing assembly 106 thus supporting the upper end of splined shaft 56. Lower hub portion 104 of splined pinion 100 is rotatably supported by bearing assembly 108 mounted on plate 74.

Splined pinion 100 is engaged by the teeth of rack 110 slideably mounted on transverse rods 112 which extend between the two plates 114 extending between plate 18 and member 74 (only one plate 114 is shown in FIG. 1). Roller 116 on rack 110 engages cam groove 118 in barrel cam 120. Gear 122 on barrel cam 120 is driven by gear 90 on main drive shaft 92. It will thus be seen that rotation of main drive shaft 92 and gear 90 will drive gear 122 thus rotating barrel cam 120 to oscillate rack 110 transversely on rods 112, thus oscillating splined pinion 100, splined shaft 56, gun 54 and needle 58 as above-described.

The mechanism thus-far described comprises conventional gun-type, in-slot stator winding apparatus of the type shown and described in the aforesaid U.S. Pat. No. 3,025,008.

Referring now more particularly to FIGS. 3 through 6, in accordance with the invention, during formation of the end turns of the coil being wound on stator core member 30, wire 64 is withdrawn from the source of wire (not shown) and pushed through needle 58 by pushing assembly 124 at a linear rate faster than the rate of movement of gun 54, pushing mechanism 124 being deactuated while gun 54, needle 58 are dispensing wire into slots 39 to form the coil sides so that needle 58 pulls the wire into slots 39.

Pushing assembly 124 comprises a pair of rollers 126, 128 with wire 64 passing between the peripheries thereof. Flexible tube 130 extends between rollers 126, 128 and lower end 76 of splined shaft 56, being coupled thereto by rotatable connection 132. Wire 64 thus extends through flexible tube 130 from rollers 126, 128 to opening 62 in splined shaft 56.

Each of the rollers 126, 128 comprises metal hub 132 having peripheral band 134 of resilient material thereon and gear 136 secured thereto. Upper roller 126 is mounted on shaft 138 of hydraulic motor 149 and is driven thereby, hydraulic motor 140 being mounted on side element 142 of mounting bracket 144 secured to side plate 16 of frame 10 by threaded fasteners 146.

Lower pulley 128 is mounted on shaft 146 by antifriction bearings 147 secured at the outer ends of lever members 148 having their inner ends pivotally mounted, as at 150 to block 152 extended downwardly from bottom element 154 of mounting bracket 144. Bottom element 154 has slot 156 therein which accomodates rollers 126, 128. It will be seen that pivoted levers 148 permit rollers 126, 128 to move in and out of the peripheral engagement, gears 136 being in mesh when rollers 126, 128 are thus peripherally engaged and remaining in mesh when rollers 126, 128 are disengaged. When so peripherally engaged, rollers 126, 128 drivingly engage wire 64 so as to withdraw it from the source and push it through flexible tube 130, passage 62 in spline shaft 56, passage 60 in gun 54, and needle 58. Rear tube 133 guides wire 64 from the source to rollers 126, 128.

Shaft 158 rotatably supported by pillow blocks 160 is axially aligned with shaft 138 of hydraulic motor 140 however, shafts 158 has eccentric portion 162 at the end thereof having its axis eccentrically disposed with respect to the axes of shafts 138, 158. Eccentric portion 162 of shaft 158 is connected to shaft 146 by link 164. It will now be seen that rotation of shaft 158 and eccentric portion 162 will cause link 164 to oscillate lower roller 128 between its position in engagement with upper roller 126, as show in solid lines in FIG. 4, and a lower, disengaged position as shown in dashed lines at 166.

Rearwardly extending bracket 168 attached to bottom element 154 of bracket assembly 144 carries felt pad 170 over which wire 64 from the source passes. Bracket 172 extends rearwardly from one of the pivoted lever members 148 and the upstanding portion 174 carrying felt pad 176 cooperating with pad 170. It will now be seen that when rollers 126, 128 are disengaged, pads 170, 176 will be engaged with wire 64 therebetween thereby placing tension on the wire.

Main drive shaft 92 is coupled to drive shaft 92a by clutch and brake assembly 178. Drive motor 180 drives shaft 92a through belt 182. Hydraulic pump 184 is driven by shaft 92a and is coupled to hydraulic motor 140 by hydraulic lines 186. Shaft 92a drives shaft 158 through belt 188. It will be understood that a one-to-two ratio is required between the speed of crank 86 and gear 88 which reciprocate splined shaft 56 and gun 54, and the speed of shaft 158.

The diameter of pulleys, 126, 128, which are of equal size, is selected so that when the pulleys are peripherally engaged, as above described, wire 64 is withdrawn from the source and pushed through needle 58 at a rate faster than the rate of movement of gun 54. It will be seen that when rollers 126, 128 are engaged, gears 136 are in mesh thereby positively driving roller 128.

Figure 7:
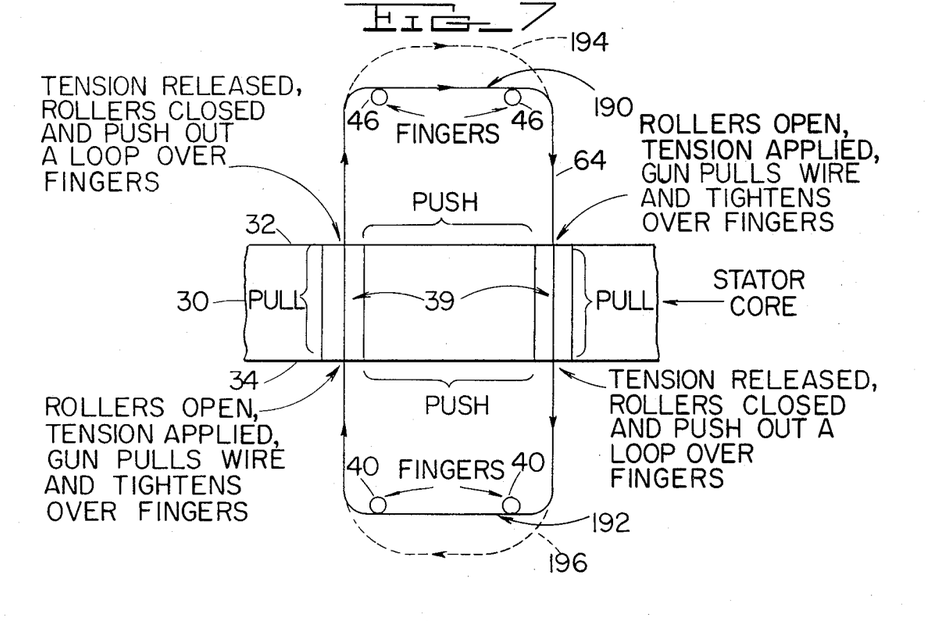
FIG. 7 is a diagrammatic illustration showing the method of the invention.

Referring now additionally to FIG. 7, it will be seen that gun 54 moves upwardly through bore 38 of stator core 30 with needle 58 thus dispensing wire directly into one slot 39. Gun 54 and needle 58 then rotate so as to form an end turn 190 around roll-out fingers 46. Gun 54 then moves downwardly through bore 38 with needle 58 dispensing wire 64 directly into the other slot 39, and gun 54 and needle 58 then rotate in the opposite direction to form the other end turn 192 over roll-out fingers 40.

In accordance with the invention, shaft 158 and its eccentric portion 162 are so phased with respect to drive shafts 92, 92a that rollers 126, 128 are disengaged or open and pads 170, 176 are applying tension to wire 64 as gun 54 is moving through bore 38 of stator core member 30. Thus, dispensing needle 58 pulls wire 64, under tension, into one of the slots 39 as gun 54 moves upwardly. When needle 58 moves upwardly beyond upper surface 32 of stator core member 30, rollers 126, 128 are moved into engagement or closed, the tension applied to wire 64 by pads 170, 176 is released, and rollers 126, 128 are driven to push out a loop of wire over roll-out fingers 46, as shown by dashed line 194. As gun 54 and needle 58 move downwardly toward upper surface 32, rollers 126, 128 are again opened, tension is applied to wire 64 by pads 170, 176, and further downward movement of gun 54 and needle 58 thru bore 38 tightens end turn 190 over fingers 46 and pulls the wire directly into the other slot 39. As needle 58 moves away from bottom side 34 of stator core member 30, the tension is released, rollers 126, 128 are again closed and driven at a speed to push out another loop over lower roll-out fingers 40, as shown by dashed line 196. As needle 58 again approaches bottom side 34 as gun 54 is moving upwardly, rollers 126, 128 are again opened, tension is again applied by pads 170, 176 to wire 64, and further upward movement of gun 54 through bore 38 causes needle 58 to tighten end turn 192 over lower roll-out fingers 40 and to pull wire 64 directly into the first slot 39. The operation is then continued in this fashion until the desired number of turns have been wound.

The pushing out of an initially large end turn loop in accordance with the invention and subsequent tightening of the end turn, as above described, results in the loops generally being pulled behind previously formed end turns so that the end turns do not pile up and tend to move forwardly toward the bore as has heretofore been the case with prior gun-type, in-slot stator winding apparatus. Resultantly, more compact, lower end turns are provided having better distribution than has previously been the case.

Following the completion of the winding of the coil as above-described, clamping ring 42 is raised with hook members 50 carrying the wound stator core member 30 with the clamping ring, lower roll-out fingers 40 pivoting upwardly and away from end turns 192 as described in the aforesaid U.S. Pat. No. 2,967,672. Hooks 50 are then released permitting the wound stator core member 30 to be lowered manually from clamping ring 42 with upper roll-out finger 46 pivoting downwardly and away from end turns 190.

Referring again to FIG. 6, it may be desirable, depending on the build-up of end turns 190, 192, to push out progressively larger loops 194, 196 as the winding of the coil progresses. This may be accomplished by employing a selectively variable displacement pump 184 have a control lever 198; movement of lever 198 to increase or decrease the pump displacement results in increasing or decreasing the speed of hydraulic motor 140. The number of turns of the coil being wound is counted by counter 200 cooperating with counting disc 202 on shaft 92a. Control lever 198 is actuated by fluid power cylinder 204 under the control of volume control valve 206 which is coupled to counter 200 and operated thereby.

During the winding of a first predetermined number of turns as above-described, pump 184 operates motor 140 at a first predetermined speed thereby to provide smaller loops 194, 196. Upon completion of the first predetermined number of turns, counter 200 operates valve 206 to actuate cylinder 204 which actuates lever 198 thereby causing pump 184 to operate motor 140 at a higher speed thereby to push out larger loops 194, 196. The number of increments in speed of motor 140 and thus the size of loops 194, 196 will depend upon the build-up of end turns 190, 192, i.e., the number of turns in the coil. In a given case, there may be three or more such increments. Alternatively, rather than increasing the speed of motor 140 and thus the size of loops 194, 196 incrementally, valve 206 may continuously actuate cylinder 204 in response to counter 200 as the number of turns increases.

Figure 8:
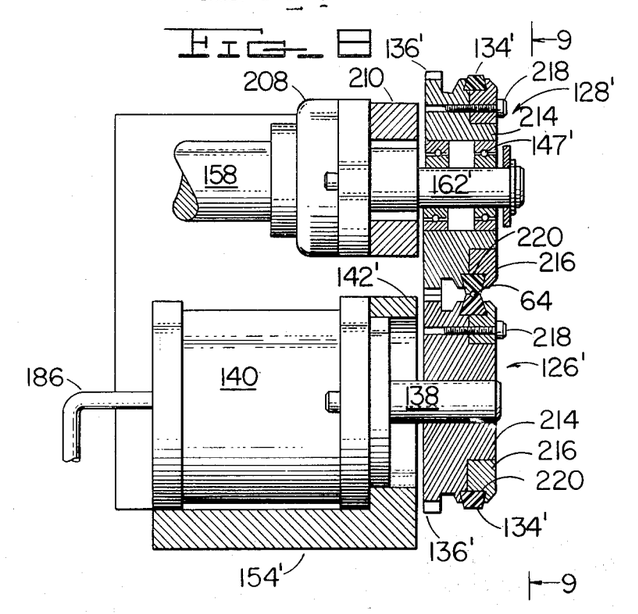
FIG. 8 is a fragmentary end cross-sectional view showing a modification of the invention.
Figure 9:
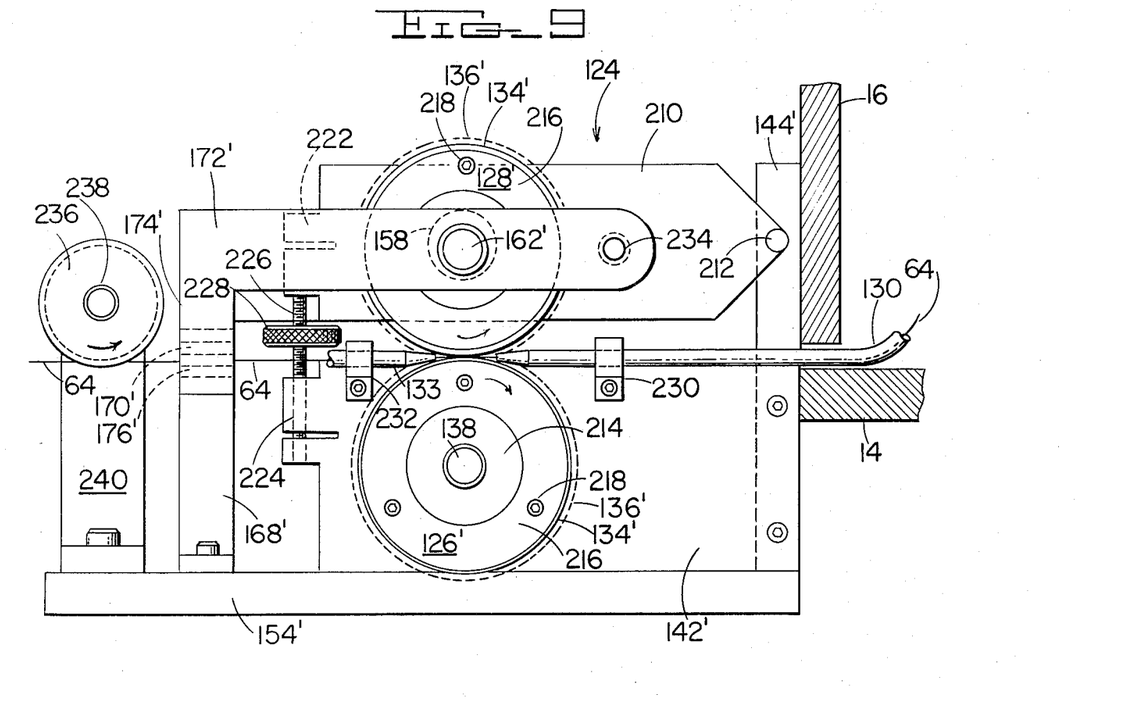
FIG. 9 is a fragmentary side view taken generally along the line 9—9 of FIG. 8.
Figure 10:
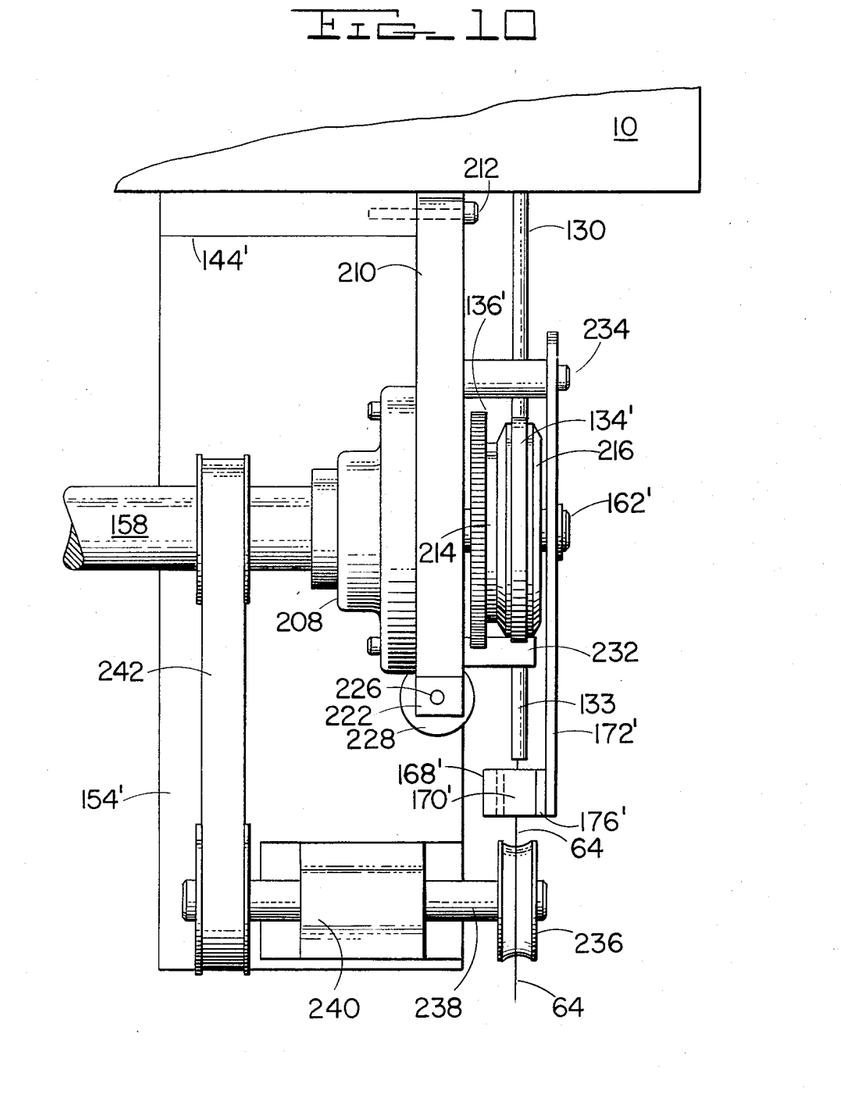
FIG. 10 is a fragmentary top view of the modification of FIGS. 8 and 9.

Referring now to FIGS. 8, 9 and 10 in which like elements are indicated by like reference numerals and similar elements by primed reference numerals, there is shown a preferred embodiment of pushing assembly 124. Here shaft 158 is journaled in self-aligning bearing 208 mounted on lever member 210. Roller 128' is rotatably mounted by antifriction bearings 147' on eccentric portion 162 of shaft 158. Lever member 210 is mounted for limited pivotal movement on mounting bracket 144', as by stud 212.

Hydraulic motor 140 is mounted on side element 142' of mounting bracket 144'. Roller 126' is mounted on shaft 138 of motor 140 and is driven thereby. Gears 136' are respectively formed on hubs 214 mounted on bearings 147' and shaft 138, respectively. Annular members 216 are secured to hubs 214 by threaded fasteners 218 and define therewith grooves 220 which respectively removably receive and clamp resilient bands 134' formed of suitable material, such as polyurethane. In the illustrated embodiment, bands 134' are inverted V-belts.

It will now be seen that rotation of shaft 158 and eccentric portion 162' directly oscillates roller 128' between its position in engagement with roller 126' and its disengaged position, gears 136' remaining in mesh when rollers 126', 128' are disengaged.

Lever member 210 and side element 142' respectively have rearwardly projecting portions connected by threaded element 226 having thumb wheel 228 thereon. It will be seen that adjustment of thumb wheel 228 thus pivoting lever member 210 slightly will adjust the arc of contact of bands 134' of rollers 126', 128', thus determining the starting and stopping points of the pushing operation. Self-aligning bearing 208 accommodates the slight misalignment of shaft 158 due to the limited pivotal movement of lever member 210.

Tubes 130, 133 are respectively secured to side element 142' by clamps 230, 232. Bracket 168' attached to bottom element 154' of bracket assembly 144' carries felt pad 170' under which wire 64 passes. Member 172' is journaled on eccentric portion 162' of shaft 158, is pivotally connected to lever member 210, as by stud 234, and has downwardly extending portion 174' at its rear end carrying felt pad 176' cooperating with pad 170', wire 64 extending between pads 170', 176'. It will be seen that when rollers 126' 128' are disengaged, member 172' will be pivoted upwardly thereby causing pads 170', 176' to engage placing tension on wire 64.

In order to eliminate variations in tension placed on wire 64 by a dereeling device (not shown), wire 64 is trained around capstain 236 driven by shaft 238. Shaft 238 is supported by bearing assembly 240 mounted on bottom element 154' of mounting bracket 144' and in the illustrated embodiment, is driven at a one-to-one speed ratio by belt 242 from shaft 158.

It will be seen that the embodiment of pushing assembly 124 shown in FIGS. 8, 9 and 10 provides for selective adjustment of the pressure exerted by roller 128' on roller 126', and thus the arc of contact, thereby selectively to adjust the starting and stopping points of the end turn loop pushing operation, and further provides, by capstan 236, constant initial tension on wire 64.

While roll-out fingers 40, 46 have been shown and described in connection with the apparatus and method of the invention, the apparatus and method of the invention do not require the use of such roll-out fingers particularly in the case of stator core members for shaded pole motors.

While there have been described above the principles of this invention in connection with specific apparatus, it is to be clearly understood that this description is made only by way of example and not as a limitation to the scope of the invention.

What is claimed is:

1. In apparatus for winding dynamoelectric machine stator core members which have opposite sides and radially inwardly extending polar projections with inner ends defining a bore having an axis and defining winding slots therebetween, said apparatus comprising means for holding a stator core member to be wound, a winding gun mounted for axial movement through said bore and for rotary movement about said axis, said gun including means for dispensing wire radially with respect to said axis, means coupled to said gun for reciprocally moving the same axially through said bore between predetermined extreme positions spaced respectively from said opposite sides of said stator core member, and means coupled to said gun for rotating the same in one direction between first and second predetermined angularly spaced positions respectively aligned with two of said slots when said gun is on one side of said stator core member and in the opposite direction between said angularly spaced positions when said gun is on the other side of said stator core member whereby wire dispensed by said dispensing means forms a coil with side portions respective in said two slots and with end turn portions respectively on said opposite sides of said stator core member and connecting said side portions; the improvement comprising means for feeding wire from a source to said dispensing means including selectively actuable means for withdrawing wire from said source and for pushing the same through said dispensing means at a linear rate faster than the rate of movement of said gun, and means for actuating said withdrawing and pushing means during formation of said end turns and deactivating the same during dispensing of wire into said slots, whereby said gun and dispensing means pulls wire from said source during dispensing thereof into said slots and said wire is pushed at a faster rate during formation of said end turns initially to form enlarged end turn loops which thereafter are pulled behind previously formed end turns.

2. The apparatus of claim 1 wherein said feeding means further includes means for applying tension to said wire during dispensing thereof into said slots.

3. The apparatus of claim 1 further comprising means on each side of said stator core member for holding said end turns away from said bore and urging said coil side portions toward the back of said slots.

4. The apparatus of claim 1 wherein said withdrawing and pushing means comprises a pair of equal-diameter rollers with said wire from said source passing between the peripheries thereof, means for selectively moving said rollers into and out of peripheral engagement, and means for driving said rollers at a speed to provide said faster linear rate for said wire when said rollers are engaged, said actuating means being coupled to said moving means.

5. The apparatus of claim 4 wherein one of said rollers is mounted for rotation about a fixed axis, and driving means being coupled to said one roller, said moving means comprising means for mounting the other of said rollers for movement into and out of engagement with said one roller, said actuating means being coupled to said other roller.

6. The apparatus of claim 5 wherein each of said rollers has a gear thereon, said gears being in mesh when said rollers are in and out of engagement thereby positively to drive said other roller at all times.

7. The apparatus of claim 5 further comprising a drive shaft and first means for operatively coupling the same to said gun moving and rotating means, said mounting means comprising a pivoted lever member, said other roller being mounted on a shaft carried by said lever member, said actuating means including second means for operatively coupling said drive shaft to said other roller thereby to move the same into and out of engagement with said first roller.

8. The apparatus of claim 7 wherein said second coupling means includes eccentric means for moving said other roller.

9. The apparatus of claim 8 wherein said eccentric means comprises another shaft coupled to said drive shaft and having an eccentric portion thereon acting on said other roller.

10. The apparatus of claim 9 wherein said eccentric means further comprises a link connecting said eccentric portion and said other roller shaft.

11. The apparatus of claim 9 wherein said first coupling means includes crank means for providing said reciprocal movement of said gun, said second coupling means including means for providing a one-to-two ratio between the speed of said crank and the speed of said other shaft.

12. The apparatus of claim 7 further comprising means coupled to said lever member for applying tension to said wire from said source during dispensing thereof into said slots.

13. The apparatus of claim 1 wherein said withdrawing and pushing means comprises a pair of equal-diameter rollers with said wire from said source passing between the peripheries thereof, said actuating means being coupled to said rollers to move the same into and out of peripheral engagement, and means for driving said rollers at a speed to provide said faster linear rate when said rollers are engaged.

14. The apparatus of claim 13 wherein each of said rollers has a peripheral band of resilient material thereon.

15. The apparatus of claim 14 further comprising means for selectively adjusting the arc of contact of said peripheral bands during engagement thereof thereby selectively to adjust the starting and stopping points of said pushing of said wire.

16. The apparatus of claim 15 wherein each of said bands comprises an inverted V-belt, each of said rollers including means for removably clamping the respective V-belt.

17. The apparatus of claim 13 further comprising a shaft and first means for operatively coupling said gun moving and rotating means thereto, one of said rollers being mounted for rotation about a fixed axis, said driving means being coupled to said one roller, said actuating means including second means for operatively coupling said shaft to said other roller thereby to move the same into and out of engagement with said first rollers.

18. The apparatus of claim 17 wherein said second coupling means comprises an eccentric portion on said shaft acting on said other roller.

19. The apparatus of claim 18 wherein said other roller is rotatably mounted on said eccentric portion.

20. The apparatus of claim 17 further comprising a capstan having said wire extending between said source and said rollers trained therearound, and third means for operatively coupling said capstain to said shaft.

21. The apparatus of claim 13 wherein said drive means includes means for selectively varying the speed of said rollers.

22. The apparatus of claim 21 further comprising means for counting the number of coils wound on said stator core member, said speed varying means including means for increasing the speed of said rollers in response to said counting means, thereby pushing out larger end turn loops as the winding of said coil progresses.

23. The apparatus of claim 22 wherein said driving means comprises a fluid motor operatively coupled to drive one of said rollers, and a selectively variable displacement fluid pump coupled to said motor for driving the same, said speed varying means being coupled to vary the displacement of said pump.

24. The apparatus of claim 1 wherein said feeding means further includes a capstan having said wire from said source trained therearound, and means for driving said capstain.

* * * * *

UNITED STATES PATENT OFFICE
CERTIFICATE OF CORRECTION

Patent No. 3,856,221  Dated December 24, 1974

Inventor(s) Robert E. Arick #3 - Ralph A. Vogel #5

It is certified that error appears in the above-identified patent and that said Letters Patent are hereby corrected as shown below:

IN THE SPECIFICATION

Col. 1, Line 56   "321,992" should be -- 331,992 --
Col. 4, Line 62   "149" should be -- 140 --
Col. 5, Line 32   "the" should be -- has --

IN THE CLAIMS

Claim 5, Col. 9, Line 11   "and" should be -- said --

Signed and Sealed this twenty-eight Day of October 1975

[SEAL]

Attest:

RUTH C. MASON
Attesting Officer

C. MARSHALL DANN
Commissioner of Patents and Trademarks